(12) United States Patent
Themont (10) Patent No.: US 6,620,370 B2
(45) Date of Patent: Sep. 16, 2003

(54) METHOD FOR MANUFACTURING OPAQUE RIB STRUCTURES FOR DISPLAY PANELS

(75) Inventor: Jean-Pierre Themont, Montigny-sur-Loing (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/184,861

(22) Filed: Jun. 27, 2002

(65) Prior Publication Data

US 2002/0166342 A1 Nov. 14, 2002

Related U.S. Application Data (62) Division of application No. 09/459,248, filed on Dec. 10, 1999, now Pat. No. 6,412,305.
(60) Provisional application No. 60/117,158, filed on Jan. 25, 1999.

(30) Foreign Application Priority Data

Dec. 21, 1998 (EP) .............................................. 98403244

(51) Int. Cl.⁷ ............................ H05B 6/00; C03B 19/09
(52) U.S. Cl. ....................... 264/434; 264/614; 264/642; 65/71.3
(58) Field of Search ................. 65/17.3, 17.6; 264/434, 494, 496, 614, 642

(56) References Cited

U.S. PATENT DOCUMENTS

| | | | |
|---|---|---|---|
| 2,303,395 A | 12/1942 | Schultz et al. | |
| 4,824,765 A * | 4/1989 | Sperry et al. | ............... 430/281 |
| 4,853,590 A | 8/1989 | Andreadakis | |
| 4,896,149 A | 1/1990 | Buzak et al. | |
| 5,036,317 A | 7/1991 | Buzak | |
| 5,077,553 A | 12/1991 | Buzak | |
| 5,272,472 A | 12/1993 | Buzak | |
| 5,313,223 A | 5/1994 | Buzak | |
| 5,412,867 A | 5/1995 | Aikawa et al. | |
| 5,514,503 A | 5/1996 | Evans et al. | |
| 5,540,147 A | 7/1996 | Johnson | |
| 5,544,582 A | 8/1996 | Bocko et al. | |
| 5,609,704 A | 3/1997 | Hayama et al. | |
| 5,624,775 A | 4/1997 | Carre et al. | |
| 5,678,483 A | 10/1997 | Johnson | |
| 5,701,815 A | 12/1997 | Bocko et al. | |
| 5,836,798 A * | 11/1998 | Dannoux et al. | ............... 445/24 |
| 5,840,465 A | 11/1998 | Kakinuma et al. | |
| 5,846,366 A | 12/1998 | Jin et al. | |
| 5,853,446 A * | 12/1998 | Carre et al. | ................... 65/17.3 |
| 6,251,208 B1 | 6/2001 | Serizawa et al. | |
| 6,321,571 B1 | 11/2001 | Themont et al. | |
| 6,361,390 B1 * | 3/2002 | Sreeram et al. | ................ 445/24 |

FOREIGN PATENT DOCUMENTS

| | | |
|---|---|---|
| JP | 4-075232 | 3/1992 |
| JP | 4-255638 | 9/1992 |

* cited by examiner

Primary Examiner—Christopher A. Fiorilla
(74) Attorney, Agent, or Firm—Maurice M. Klee, Ph.D.

(57) ABSTRACT

Plasma addressed liquid crystal display ribs are formed by a method which includes forming a temporary mask on portions of a surface of a substrate, depositing a layer of a glass paste having a curable medium and at least one pigment blended therein over the substrate and temporary mask, micro-molding rib structures from the glass paste on the substrate surface in areas between the masked sections, removing any residual layer of paste material present on the temporary mask, removing the temporary mask from the substrate, and firing the substrate with micro-molded rib structures thereon.

7 Claims, 6 Drawing Sheets

METHOD FOR MANUFACTURING OPAQUE RIB STRUCTURES FOR DISPLAY PANELS

This is a divisional application of Ser. No. 09/459,248 filed Dec. 10, 1999, now U.S. Pat. No. 6,412,305, which claims benefit to provisional application Ser. No. 60/117,158 filed Jan. 25, 1999.

CROSS-REFERENCE TO RELATED APPLICATIONS

This application discloses subject matter related to co-pending applications "METHOD OF MAKING GLASS STRUCTURES FOR FLAT PANEL DISPLAYS" (ATTORNEY REFERENCE-P14148) filed on Dec. 21, 1998, as European Patent Application No. 98403245.8 and on Jan. 25, 1999 as U.S. application Ser. No. 60/117,206; and U.S. application Ser. No. 08/820,206 filed Mar. 18, 1997; the disclosures of which are incorporated herein by reference.

FIELD OF THE INVENTION

The invention relates to the field of flat panel displays, and in particular, to the manufacture of opaque rib structures for plasma addressed liquid crystal (PALC) displays.

BACKGROUND INFORMATION

Flat panel displays, e.g., liquid crystal displays, are known. Recently, the use of plasma channels to address a liquid crystal display (LCD) has become known. For example, U.S. Pat. Nos. 4,896,149, 5,036,317, 5,077,553, 5,272,472, 5,313,223, the disclosures of which are all hereby incorporated by reference, each disclose such a structure. This type of display technology provides an active addressing matrix suitable for high-line-count displays, and is a competitive alternative to the known thin-film transistor (TFT) active matrix approach.

These plasma channel panels are also referred to herein as plasma addressed liquid crystal (PALC) displays. This type of plasma display panel is generally formed of two parallel substrates separated from each other to form a discharge space between the substrates, which is filled with a discharge gas, such as a mixture of helium, neon and xenon. The inner-facing surface of each of the substrates bears a pattern of spaced parallel electrodes, with the electrodes on one substrate being oriented, for example, in a direction orthogonal to the direction of the electrodes on the other substrate. The electrode bearing surfaces of the substrates are typically covered with a dielectric layer, and red, green and blue phosphors are separately located in discrete areas on the internal surface of the dielectric layer on one of the two substrates. The dielectric layers are generally lead-based glass frits fired between 500 and 600° C., depending on their formulation and the level of uniformity required. The displayed picture is produced by plasma discharges which are induced locally in the gas by applying a suitable voltage between the electrodes of one substrate and the electrodes of the other substrate. Ultraviolet light emitted locally by the gas discharge induces luminescence of the neighboring phosphors.

Figure 1:
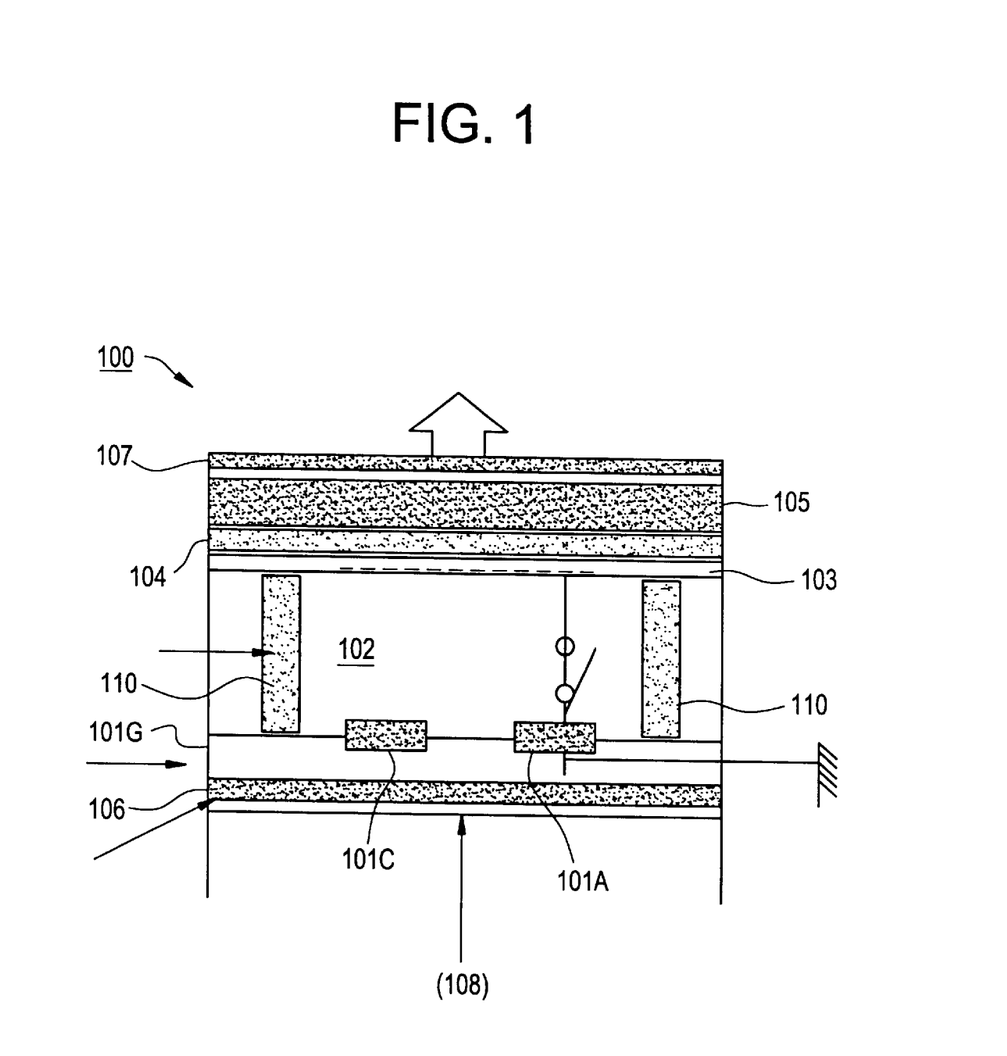
FIG. 1 illustrates a cross-sectional view of a conventional Plasma Addressed Liquid Crystal (PALC) display.

A PALC display relies on the highly non-linear electrical behavior of a relatively low pressure (e.g., 10 to 100 Torr) gas, e.g., He, confined in parallel channels. A cross section of a portion of a PALC display 100 is shown in FIG. 1. A pair of parallel electrodes 101A (anode) and 101C (cathode) is deposited in each channel 102 on a rear glass plate 101G, for example, forming the bottom of the channels, and a very thin dielectric sheet 103, e.g., a glass micro-sheet of about 50 $\mu$m thickness, forms the top of the channels 102. A liquid crystal layer 104 on top of the micro-sheet 103 is the optically active portion of the display 100. A cover sheet 105, e.g., a passive glass plate of about 1.1 mm, with transparent conducting electrodes, e.g., made from indium-tin oxide (ITO), running perpendicular to the plasma channels 102, lies on top of the liquid crystal 104. Conventional polarizers 106, color filters 107, and back lights 108, like those found in other conventional liquid crystal displays, are also commonly used, as illustrated.

When voltages are applied to the transparent electrodes, since there is no ground plane, the voltages are divided among the liquid crystal, the micro-sheet, the plasma channel, and any other insulators intervening between the transparent electrode and whatever becomes the virtual ground. As a practical matter, this means that if there is no plasma in the plasma channel, the voltage drop across the liquid crystal will be negligible, and the pixels defined by the crossings of the transparent electrodes and the plasma channels will not switch. If, however, a voltage difference sufficient to ionize the gas is first applied between the pair of electrodes in a plasma channel, a plasma forms in the plasma channel so that it becomes conducting, and constitutes a ground plane. As a result, for pixels atop this channel, the voltages will be divided between the liquid crystal and the micro-sheet only. This places a substantial voltage across the liquid crystal and causes the pixel to switch. Igniting a plasma in the channel causes the row above the channel to be selected. Because the gas in the channels is non-conducting until a well-defined threshold voltage between the electrode pair is reached, the rows are extremely well isolated from the column voltages unless selected. This high non-linearity allows large numbers of rows to be addressed without loss of contrast.

In order to avoid luminous cross-talk between neighboring regions and improve the contrast in such displays, opaque barrier ribs 110 are disposed on at least one of the substrates (typically the rear one) forming electrically insulated discharge cells. The barrier rib structure is typically periodic with a pitch of, for example, from 200 $\mu$m to 400 $\mu$m, depending on the panel resolution. These ribs are, for example, about 30–100 $\mu$m wide and 100–200 $\mu$m thick (i.e., high).

Alternatively, a closed cell design has been employed having square cells which are about 200–400 $\mu$m on each side. The "ribs" which form these square cells are about 30 $\mu$m to 70 $\mu$m wide and about 30 to 200 $\mu$m high. Plasma panels of this type are described, for example, in U.S. Pat. No. 4,853,590, as well as Japanese Patent Application Nos. J04255638 and J04075232. The networks of parallel barrier ribs mentioned above delimit columns of pixels which can be addressed independently. The two perpendicular networks of electrodes allow ionization of the gas at the selected pixels. The ultraviolet radiation emitted by the ionized gas causes the excitation of areas of phosphorescent products associated with said pixels according to the configuration of an image which is to be displayed.

In the past, the barrier ribs have typically been made either by a silk-screening method, or by sandblasting from a deposited layer of frit. Related co-pending U.S. application Ser. No. 08/820,206, referenced above, discloses micromolding processes for making the barrier ribs. One disadvantage associated with these micromolding methods, particularly when depositing opaque rib materials, is the possibility of depositing a thin film of opaque material on the glass substrate between rib structures. Conventional screen printing and photolithography-based methods typically avoid residual film formation between the ribs. However, for low cost processes in which it is desirable to limit the number of printing steps, screen printing and photolithography-based methods are limited to producing low thickness ribs, e.g., about 20 microns. Conventional methods, however, typically use solvent based materials which can cause difficulties in maintaining rib shapes, particularly high aspect ratio ribs, usually requiring additional consolidation steps to maintain rib shape. Accordingly, a need exists for improved methods of manufacturing opaque rib structures for PALC displays.

SUMMARY OF THE INVENTION

This invention provides novel methods for making opaque rib structures for flat panel displays that utilize micro-molding techniques but that do not leave a residual film of opaque material between the rib structures. The invention also provides improved micromolding methods that result in improved structures and lower manufacturing costs.

According to an aspect of the invention, a method of manufacturing opaque rib structures for use in a flat panel display, such as a plasma addressed liquid crystal (PALC) display, includes providing a substrate and an intaglio collector having cavities formed in its surface complimentary to the desired size and spacing of the barrier ribs. A hardenable glass paste which includes a glass frit and a hardenable, settable or curable medium (hereinafter referred to collectively as "curable"), e.g., an ultra-violet sensitive medium, is provided into the collector cavities to define rib structures. Useful curable media should be micromoldable and easily removed by burning, and include both thermoplastic and thermosetting materials. However, thermoplastic materials are generally preferred. The rib structures are transferred from the collector to a surface of the substrate while being at least partially hardened or cured, by exposure to ultra-violet light, for example. The curable medium, e.g., the ultra-violet sensitive medium, may then be removed from the rib structures on the substrate surface by performing a burn-out generating porosity in the rib structures. The substrate having porous rib structures may then be dipped into a solution containing an opaque pigment which is absorbed into the rib structures, rinsed in a suitable rinsing solution, such as water and alcohol, to remove excess pigment, and fired.

According to another aspect of the invention, an alternative method of manufacturing opaque rib structures for use in a flat panel display, such as a plasma addressed liquid crystal (PALC) display, includes: (a) forming a temporary mask on portions of a surface of a substrate; (b) depositing a calibrated layer, i.e., a layer having a uniform thickness within a close tolerance, e.g., ±10%, of a hardenable glass paste containing glass frit, a curable medium, e.g., a thermoplastic or thermosetting medium, and at least one opaque pigment blended therein, over the substrate and temporary mask; (c) micro-molding rib structures of the glass paste by application of an intaglio plate or roll to the coated substrate surface and curing the curable medium; (d) removing any residual layer of opaque paste material present on the temporary mask between the rib structures; (e) removing the temporary mask from the substrate; and (f) firing the substrate with micro-molded rib structures thereon. Useful curable media should be micromoldable and easily removeable by burning, and are preferably thermoplastic.

According to another aspect of the invention, a further alternative method of manufacturing opaque rib structures for use in a flat panel display, such as a plasma addressed liquid crystal (PALC) display, includes extruding a glass paste having a curable medium onto a surface of a substrate in a pattern defining ribs, and firing the substrate with glass paste rib pattern thereon. As in the other embodiments, useful curable media should be easily removable by burning, and are preferably thermoplastic. The glass paste may be impregnated with an opaque pigment, or may be made porous, dipped and rinsed, as summarized above with respect to the first alternative methods.

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

FIG. 1 illustrates a cross-sectional view of a conventional Plasma Addressed Liquid Crystal (PALC) display, which has been briefly discussed in the Background section of this disclosure. A pair of parallel electrodes 101A (anode) and 101C (cathode) is deposited in each channel 102 on a rear glass plate 101G, for example, forming the bottom of the channels, and a very thin dielectric sheet 103, e.g., a glass micro-sheet of about 50 $\mu$m thickness, forms the top of the channels 102. A liquid crystal layer 104 on top of the micro-sheet 103 is the optically active portion of the display 100. A cover sheet 105, e.g., a passive glass plate of about 1.1 mm, with transparent conducting electrodes, e.g., made from indium-tin oxide (ITO), running perpendicular to the plasma channels 102, lies on top of the liquid crystal 104. Conventional polarizers 106, color filters 107, and back lights 108, like those found in other conventional liquid crystal displays, are also commonly used, as illustrated. Opaque ribs 110 separate the channels 102.

Three exemplary alternative techniques for making opaque ribs according to the invention will now be described.

Figure 2A:
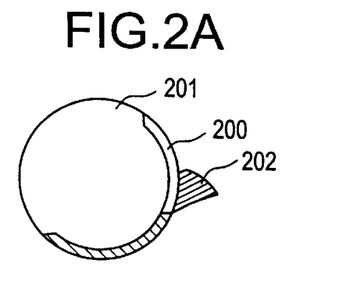
FIGS. 2A to 2G illustrate a first exemplary method of forming opaque rib structures according to the invention.

A first described method is illustrated in FIGS. 2A to 2G. Step 1, the filling step, is illustrated in FIG. 2A. Prior to step 1, a pattern for making the rib structures is predefined as a series of recesses or cavities 200 in an intaglio collector 201, and a quantity of raw rib material 202 is provided. In Step 1, the raw material 202 used to make the ribs, i.e., a glass frit paste containing a curable organic medium, is doctor-bladed into the recesses or cavities 200 formed in a soft intaglio collector 201, preferably on a cylinder, filling the pattern of cavities defining the rib structure to be made.

Figure 2B:
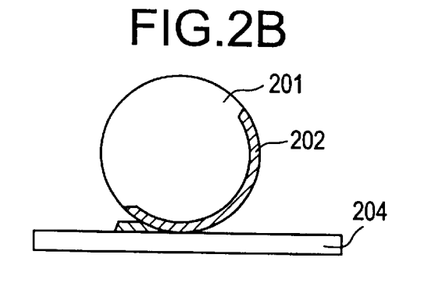
Figure 2C:
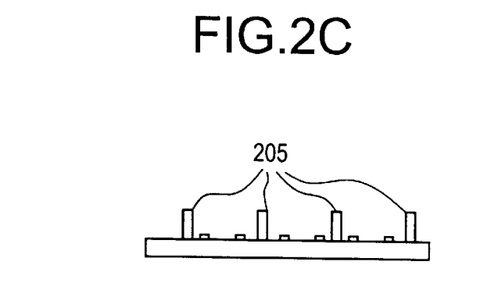

In Step 2, the transfer step illustrated in FIG. 2B, the paste rib material 202 in the collector 201 is transferred to a surface of a substrate 204, e.g., a glass substrate with or without electrodes already formed thereon, to establish ribs 205 shown in FIG. 2C. If the paste rib material 202 is curable by ultra-violet exposure, then the transferring is done under ultra-violet (UV) exposure to at least partially cure the material 202 so that is will hold its rib shape after the transfer. If the paste rib material 202 is made of a frit and an organic UV-sensitive medium, the material 202 is preferably UV sensitive throughout the complete rib 205 thickness, e.g., 200 to 400 micrometers, to be able to effect complete UV curing throughout the material 202.

Figure 2D:
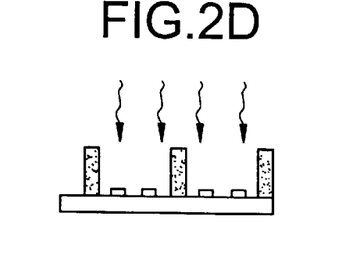

In Step 3, the burnout step represented by FIG. 2D, the organic medium in the material forming the ribs 205 is removed by heating the substrate to a temperature sufficient to "burnout" the organic material, typically to a temperature of from about 300° C. to about 400° C. The burnout step causes the material forming the ribs 205 to become porous.

Figure 2E:
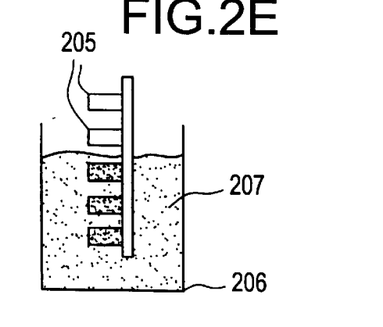
Figure 2F:
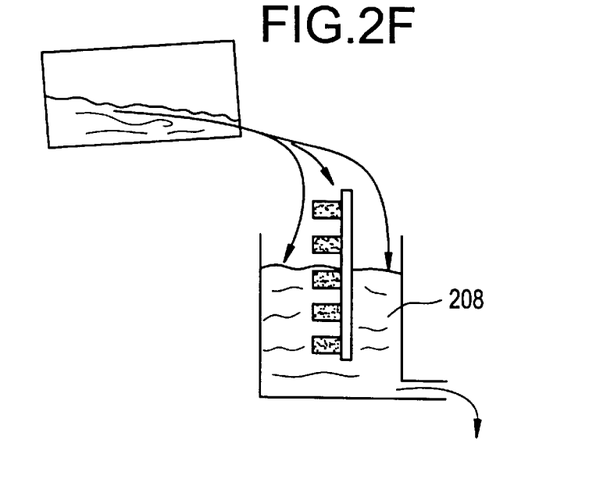

In Step 4, the dipping step illustrated in FIG. 2E, the substrate 204 with porous ribs 205 is subjected to a dipping into a container 206 having a solution 207 containing, for example, black or other opaque colored pigments, which fill the pores in the ribs 205, rendering them opaque and/or colored. Suitable pigments include metal oxides, fine powder colored glass particles, or mixtures thereof. Although dipping is preferred to facilitate the entry of the pigment bearing solution 207 into the pores of the ribs 205, other methods of accomplishing this could be used, such as spraying, as would be apparent to one skilled in the art.

Step 4 is followed by rinsing (Step 5, illustrated in FIG. 2F) in a suitable rinsing solution 208, such as water and alcohol, to remove the pigment solution from the non-porous regions of the substrate. Thereafter, the substrate is dried and fired (Step 6 illustrated in FIG. 2G) at a temperature sufficient to fuse the glass frit, e.g., from about 450° C. to about 600° C.

Figure 2G:
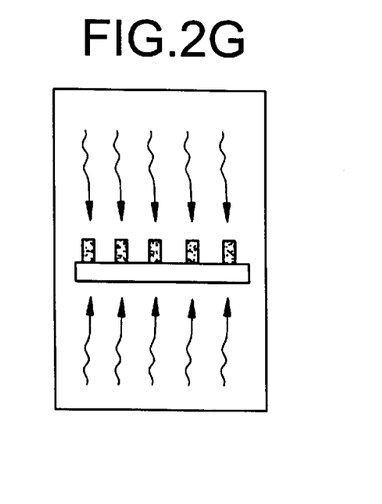

The above described process is compatible with electrode dispensing techniques, such as, photolithography and screen-printing. In this regard, during the process of forming the rib structures 205 on the glass substrate 204, the substrate surface between ribs remains transparent and virtually unaffected.

Although described above with reference to UV-sensitive, i.e., curable, media, other types of curable media could be used, such as thermoplastic or heat-curable media, within the scope and spirit of the invention. As long as the rib structure can be formed with suitable pores for receiving and retaining an opaque pigment, any suitable material can be used.

A second exemplary method according to the invention will now be described with reference to FIGS. 3A to 3G. Prior to step 1 of the method, a suitable substrate 301 is prepared with electrodes 302 according to any of a number of known techniques, for example, a color filter process as disclosed in U.S. Pat. Nos. 5,514,503; 5,701,815 and 5,544,582, or photolithography.

Figure 3A:
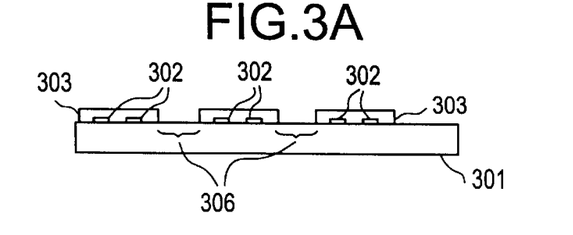
FIGS. 3A to 3G illustrate a second exemplary method of forming opaque rib structures according to the invention.

In Step 1 illustrated in FIG. 3A, a temporary mask 303, preferably formed of a water-soluble material, is printed on the glass substrate 301 already having the electrodes 302 formed thereon. The mask is printed in a pattern covering the electrodes 303, but leaving strips 306 of the substrate surface exposed between electrode pairs 302 for attachment of barrier ribs 305 to the substrate 301. A temporary water-soluble mask is preferred so that it can be easily removed after formation of the barrier ribs. Suitable water-soluble mask compositions include, for example, gelatin, polyvinyl alcohol, and hydroxyethylcellulose.

Figure 3B:
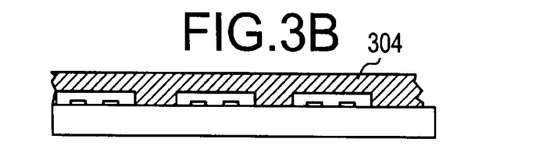

In Step 2, illustrated in FIG. 3B, a continuous layer of substantially uniform thickness 304 of a curable opaque rib material, e.g., a thermoplastic or thermosetting medium with a glass frit having black or opaque colored pigments, is bladed over the substrate surface 301 bearing temporary mask 303. Numerous curable media could be used within the spirit of the invention, including, for example, a UV-sensitive medium, as would be apparent to one skilled in the art.

Figure 3C:
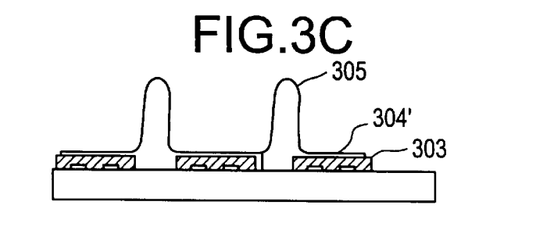

In Step 3 illustrated in FIG. 3C, this calibrated layer is micro-molded into ribs by pressing an intaglio roll or plate having a complimentary pattern of recesses against the coated surface as described in detail in U.S. patent application Ser. No. 08/820,206 incorporated by reference above.

Basically this method includes embossing a coating or layer of frit containing material deposited directly onto a substrate with a desired pattern. FIG. 3G illustrates details of an embodiment of such micro-molding, using a UV-sensitive material 312 rather than a thermoplastic material. In the embodiment illustrated in FIG. 3G, recessed pattern 316 corresponds to a desired pattern for a barrier rib structure for a plasma addressed liquid crystal display panel. The recessed surface 316 of intaglio roll 318 contacts the frit containing material 312 and embosses it to form a free standing structure corresponding to the recessed pattern 316. If needed or desired, the frit containing material 312 may be heated prior to contact with roll 318, to impart sufficient flowability of the frit containing material 312. This may be achieved, for example via radiant heating, or via hot air being blown onto the layer prior to being contacted by the intaglio roll. The material 312 is cured, e.g., via UV light 324 simultaneous with molding of the frit containing material 312 into ribs. In the case where thermoplastic material is used, hardening of the ribs after molding would be accomplished by cooling.

Of course, if the electrodes 302 are already formed on the substrate 301, as was assumed prior to step 1 of this embodiment, appropriate measures should be taken to assure alignment of the micro-molded rib structures with respect to the electrodes in the final product. Alternatively, the electrodes could be formed after the micro-molded rib structure has been formed, as would be apparent to one skilled in the art.

As can be appreciated, the layer of material to be micro-molded has a depth selected so that, during the micro-molding process, such as is illustrated in FIG. 3G, substantially all the material disposed at locations where a rib structure will not be formed is transferred by the process into an adjacent area where a rib structure will be formed, and so that an ample amount of material is available for filling the mold to form the rib structure completely, taking into account any expansion due to heating and/or contraction due to cooling. Nonetheless, a residual film of rib material is often left between rib structures.

Figure 3D:
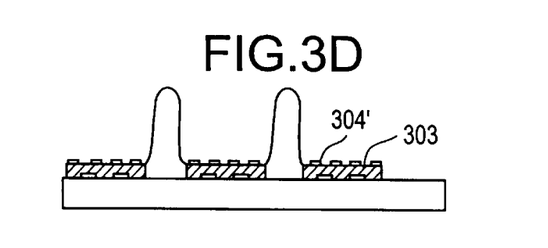

In Step 4 illustrated in FIG. 3D, this thin residual layer 304' of material present on top of the water soluble mask 303 between the ribs, is removed with an appropriate solvent.

Figure 3E:
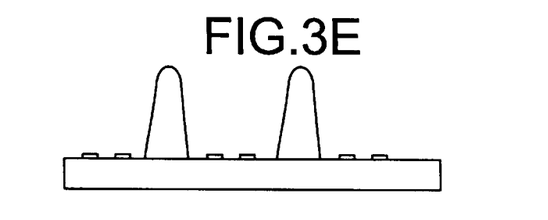
Figure 3F:
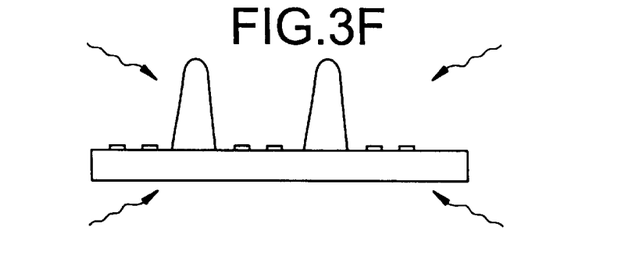
Figure 3G:
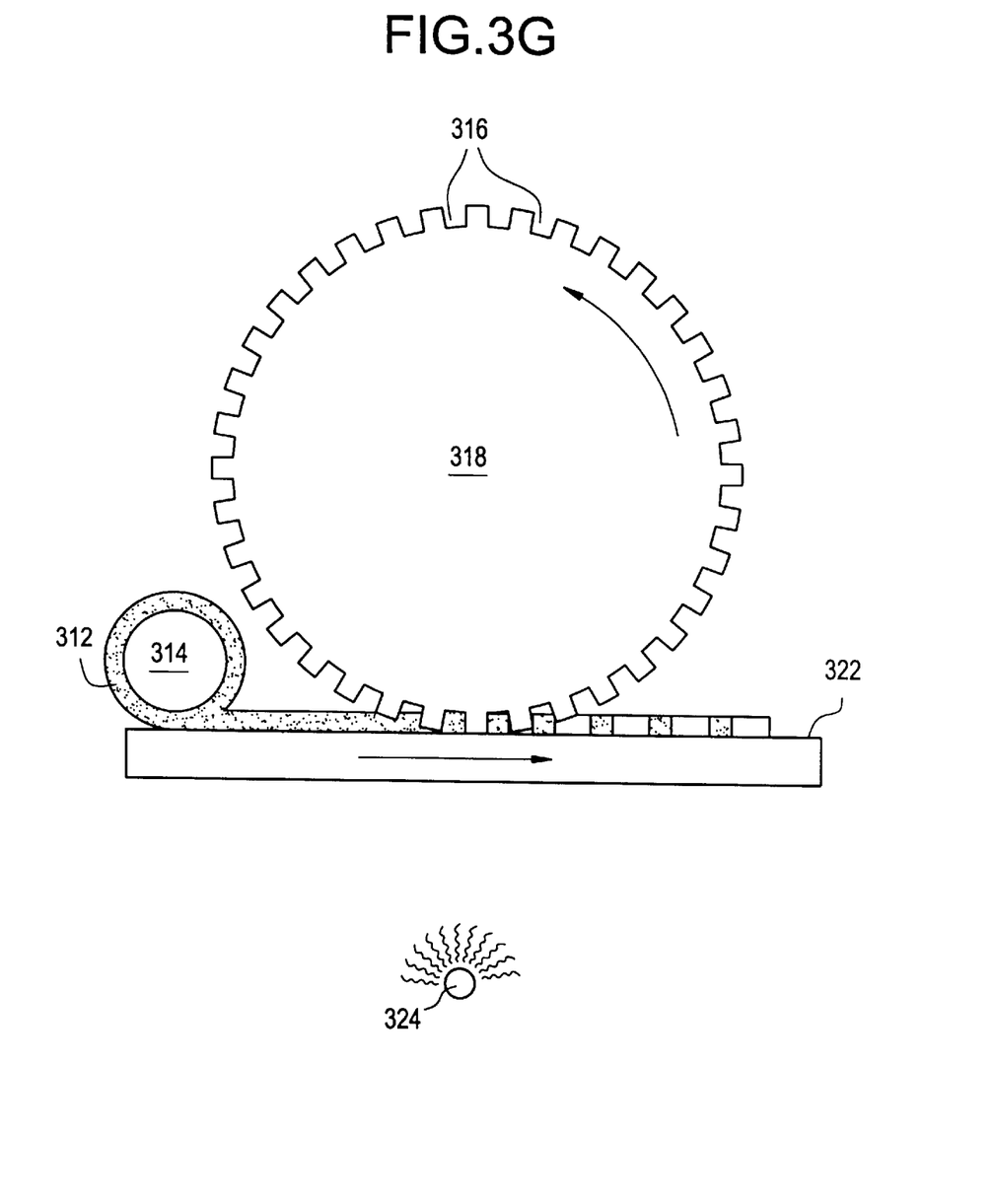

In Step 5 illustrated in FIG. 3E, the temporary mask 303 is removed with a suitable solvent. If the mask is formed of a water-soluble material, this can be accomplished by washing with water or other aqueous solutions. In Step 6 illustrated in FIG. 3F, thermal firing of the structures is performed at a temperature of from about 400° C. to about 600° C. degrees C. to fuse the frit.

As with the first exemplary process, this second exemplary process is also compatible with various electrode dispensing techniques and retains the transparency of the substrate between the opaque ribs.

Figure 4A:
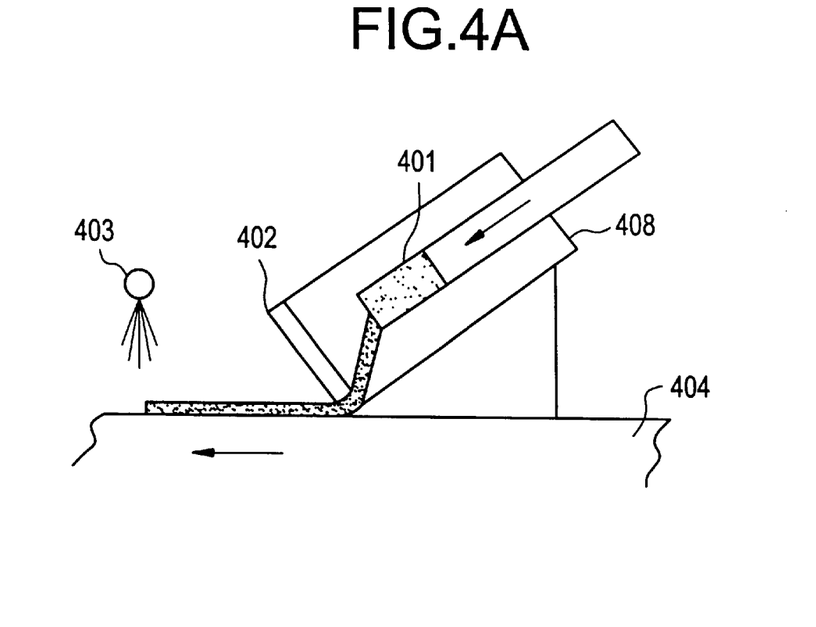
FIGS. 4A and 4B illustrate a third exemplary method of forming opaque rib structures according to the invention.
Figure 4B:
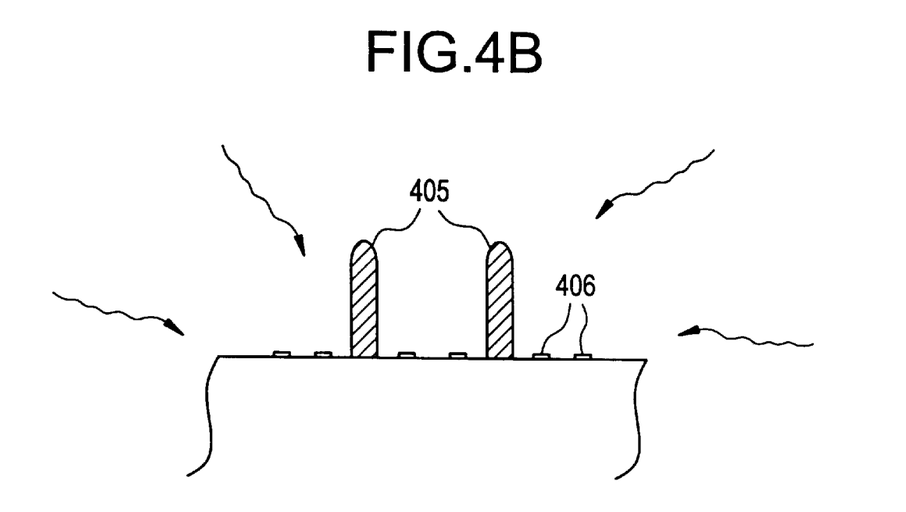

A third exemplary method according to the invention is illustrated in FIGS. 4A and 4B. In Step 1 illustrated in FIG. 4A, extrusion of the rib material, e.g., a UV sensitive material 401 with frit and black or other opaque colored pigments, through a die 402 is made under UV exposure 403 directly onto a surface of a substrate 404, e.g., glass, and then metallic electrodes 406 are formed, e.g., printed, on the substrate 404. In Step 2 illustrated in FIG. 4B, this assembly is fired, at a temperature suitable to burn out the organic media and fuse the frit, e.g., from about 400° C. to about 600° C., to complete the process.

As may be appreciated by those skilled in the art, extrusion machine 408 with die 402 deposits the rib material 401 onto the substrate 404 in a pattern of parallel ribs 405. The ribs 405 could be formed in one pass across the entire substrate 404, or by multiple passes, one for each rib 405, as should be apparent.

Besides the UV-sensitive binder material described above, a thermoplastic or other reactive binder could be used, the process being modified appropriately to substitute suitable conditions to cause hardening or cure of the binder material. Further, it should be apparent that the rib material may be of the type already having an opaque pigment disposed therein, or of the type in which the pigment is added e.g. by dipping, as described above.

The materials used for making these opaque rib structures can be obtained through blends made of a lead or non-lead base glass frit filled with adequate amounts of opacifiers added, e.g., opaque pigments, in order to obtain the desired opacity and color. For example, oxides like $Fe_2O_3$, MnO, $MnO_2$, $Cr_2O_3$ and CoO can be used to obtain a black color, and oxides like $TiO_2$, $CeO_2$, or $ZrO_2$ can be used to obtain white colors. As an alternative, commercial pigments could also be used.

Experiments have demonstrated the possibility of making such black rib structures through micro-molding techniques using a devitrifying frit compatible with a firing temperature of 550° C., the frit being filled with a commercially available black pigment from Cerdec S. A., for example.

It will be apparent to one skilled in the art that the manner of making and using the claimed invention has been adequately disclosed in the above-written description of the preferred embodiments taken together with the drawings. Further, it will be understood that the above described preferred embodiments of the present invention are susceptible to various modifications, changes, and adaptations, and the same are intended to be comprehended within the meaning and range of equivalents of the appended claims.

What is claimed is:

1. A method of manufacturing opaque rib structures on a substrate, the method comprising:

forming a temporary mask on portions of a surface of the substrate, said mask leaving a plurality of areas of the substrate surface exposed;

depositing a layer of a glass paste comprising glass frit, opaque pigment and a curable organic medium over the substrate surface and temporary mask;

molding the paste into rib structures in said exposed areas of the substrate surface not covered by said mask by pressing a mold surface having a pattern of recesses corresponding to the desired rib structures against the paste coated surface and at least partially curing the curable medium;

removing any residual layer of paste present on the temporary mask;

removing the temporary mask from the substrate; and firing the substrate with the molded rib structures thereon.

2. The method according to claim 1, wherein the substrate comprises a glass substrate having electrodes already formed thereon; and wherein the temporary mask is formed over the electrodes.

3. The method according to claim 1, wherein the curable medium is an ultraviolet light curable composition.

4. The method according to claim 1, wherein the curable medium is thermoplastic.

5. The method according to claim 1, wherein the opaque pigment is selected from the group consisting of:

a) $Fe_2O_3$, MnO, $MnO_2$, $Cr_2O_3$ and CoO alone or in combination; and b) $TiO_2$, $CeO_2$, and $ZrO_2$ alone or in combination.

6. The method according to claim 1, wherein the temporary mask comprises a water soluble material, and wherein the removing the temporary mask comprises washing with water or an aqueous solution.

7. The method according to claim 1, wherein the glass paste comprises a non-lead base glass frit.

* * * * *